Figure 1:
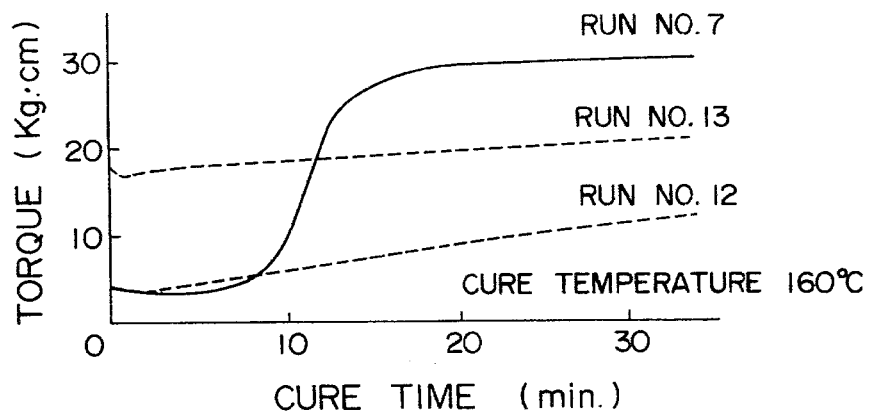

United States Patent [19]

Ohishi et al.

[11] 4,248,985
[45] Feb. 3, 1981

[54] SULFUR-CURABLE ACRYLIC RUBBER COMPOSITION

[75] Inventors: Tetsu Ohishi, Tokyo; Kohichi Handa, Kamakura; Haruo Ueno, Tokyo, all of Japan

[73] Assignee: Nippon Zeon Co., Ltd., Tokyo, Japan

[21] Appl. No.: 24,475

[22] Filed: Mar. 27, 1979

[30] Foreign Application Priority Data

Mar. 28, 1978 [JP] Japan ................... 53-35886

[51] Int. Cl.$^3$ .................. C08F 8/00; C08F 218/12
[52] U.S. Cl. ................... 525/327; 525/349; 525/351; 525/354; 526/320; 526/327
[58] Field of Search .......... 526/16, 36, 38, 41, 526/320, 327; 525/327, 349, 351, 354

[56] References Cited

U.S. PATENT DOCUMENTS

| | | | |
|---|---|---|---|
| 3,201,373 | 8/1965 | Kaizerman | 526/36 |
| 3,476,722 | 11/1969 | Schlatzer | 526/327 |
| 3,622,547 | 11/1971 | Ermidis | 526/36 |
| 4,133,793 | 1/1979 | Lewis et al. | 526/320 |

FOREIGN PATENT DOCUMENTS 47-7893 3/1972 Japan .

*Primary Examiner*—Harry Wong, Jr.

*Attorney, Agent, or Firm*—Sherman & Shalloway

[57] ABSTRACT

A sulfur-curable acrylic rubber composition is provided which comprises [I] 100 parts of an acrylic rubber resulting from the copolymerization in the presence of a radical initiator of (1) 30 to 89.5% by weight of at least one alkyl acrylate with the alkyl group containing 1 to 8 carbon atoms, (2) 0.5 to 10% by weight of at least one monomer of the general formula

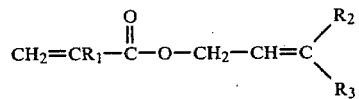

wherein $R_1$ represents a hydrogen atom or a methyl group, and $R_2$ and $R_3$, independently from each other, represent an alkyl group containing 1 to 3 carbon atoms, (3) 10 to 60% by weight of at least one alkoxyalkyl acrylate with the alkoxy group containing 1 to 4 carbon atoms and the alkylene group containing 1 to 4 carbon atoms, and 0 to 30% by weight of at least one of monovinyl and monovinylidene unsaturated compounds other than the said compounds; and [II] 1 to 5 parts by weight of a metal compound, and [III] 0.2 to 5 parts by weight, as sulfur, of at least one of sulfur and sulfur-containing organic compounds.

10 Claims, 2 Drawing Figures

SULFUR-CURABLE ACRYLIC RUBBER COMPOSITION

This invention relates to a sulfur-curable acrylic rubber composition.

Acrylic rubber is an elastomeric copolymer composed mainly of an acrylate unit, and is known to have superior heat resistance and oil resistance. Since it does not have a double bond at the main chain of the rubber molecules, a monomeric component having an active group capable of becoming a crosslinking site is usually copolymerized with it.

Monomers previously used as the monomeric component for providing crosslinking sites include, for example, halogen-containing monomers such as 2-chloroethyl vinyl ether, vinyl benzyl chloride, vinyl chloroacetate, allyl chloroacetate, and 5-chloroacetoxymethyl-2-norbornene, and epoxy monomers such as allyl glycidyl ether, glycidyl acrylate and glycidyl methacrylate.

Because these acrylic rubbers cannot be cured with ordinary sulfur (or sulfur-containing organic compound) plus vulcanization accelerator systems, amines, ammonium salts, metal soap plus sulfur, etc. are generally used as a vulcanizer. Curing with these vulcanizers, however, has the defect that the rate of cure is slow, and to obtain vulcanizates of good properties, the cured products must be heat-treated for a very long period of time after curing.

Furthermore, when the amines or ammonium salts are used as the vulcanizer, unpleasantly odoriferous gases are generated in places where rubber products are made, thus causing a sanitary hazard. This also causes the defect that the cured products cannot be used in medical and foodstuff applications.

The use of the halogen-containing monomers as the crosslinking monomeric component may cause the corrosion of the mold at the time of curing, or the corrosion of metals with which the vulcanized products will make contact.

In an attempt to remove these defects, a method was suggested which involves copolymerization of an acrylate ester with such a crosslinking monomeric component as dicyclopentadiene, methylcyclopentadiene, ethylidene norbornene, vinylidene norbornene, butadiene, isoprene, allyl acrylate, 2-butenyl acrylate, methallyl acrylate, or triallyl isocyanurate to produce an acrylic rubber. The acrylic rubbers obtained by such a method are not entirely satisfactory for practical application because of one or more disadvantages. For example, the rate of cure is extremely slow, or the properties of the cured product are far from meeting the requirements of practical application. Or although the aforesaid problems are solved to some extent, the heat resistance and compression set of the products are still inferior to acrylic rubbers obtained by using the halogen-containing monomers or epoxy monomers as the crosslinking monomeric component.

It is an object of this invention therefore to provide a sulfur-curable acrylic rubber composition by incorporating a vulcanization system into an acrylic rubber having superior compression set, which permits an improved rate of cure as fast as that for curing natural rubbers and diene-type synthetic rubbers and does not require long heat-treatment after curing, without sacrificing the superior heat resistance, oil resistance, weatherability and ozone resistance of conventional acrylic rubbers.

We have now found that an acrylic rubber suited for this object can be obtained by using a certain alkenyl acrylate and/or alkenyl methacrylate as crosslinking components.

Thus, according to this invention, there is provided a sulfur-curable acrylic rubber composition comprising [I] 100 parts by weight of an acrylic rubber resulting from the copolymerization in the presence of a radical initiator (1) 30 to 80.5% by weight of at least one alkyl acrylate with the alkyl group containing 1 to 8 carbon atoms, (2) 0.5 to 10% by weight, preferably 2 to 6% by weight, of at least one monomer of the general formula

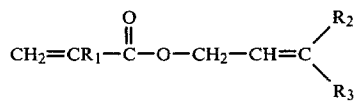

wherein $R_1$ represents a hydrogen atom or a methyl group, and $R_2$ and $R_3$, independent from each other, represent an alkyl group containing 1 to 3 carbon atoms, (3) 10 to 60% by weight, preferably 20 to 50% by weight, of at least one alkoxyalkyl acrylate with the alkoxy group containing 1 to 4 carbon atoms and the alkylene group containing 1 to 4 carbon atoms, and (4) 0 to 30% by weight, preferably 2 to 20% by weight, of at least one of monovinyl and monovinylidene unsaturated compounds other than said compounds; [II] 1 to 5 parts by weight of a metal compound; and [III] 0.2 to 5 part by weight, as sulfur, of at least one of sulfur and sulfur-containing organic compounds.

Examples of the alkyl acrylate (1) are methyl acrylate, ethyl acrylate, propyl acrylate, butyl acrylate, amyl acrylate, hexyl acrylate, cyclohexyl acrylate, and octyl acrylate. Those in which the alkyl group contains 2 to 4 carbon atoms are preferred; for example, they are ethyl acrylate, propyl acrylate and butyl acrylate.

Examples of the alkenyl acrylate and alkenyl methacrylate (2) of general formula (I) include 3-methyl-2-butenyl acrylate, 3-methyl-2-pentyl acrylate, and 3-methyl-2-hexenyl acrylate, and the corresponding methacrylates.

Acrylic rubbers made by the copolymerization of allyl acrylate or 2-butenyl acrylate with alkyl acrylates are known (U.S. Pat. No. 3,476,722). These acrylic rubbers, however, require long heat-treatment after curing as is the case with the conventional acrylic rubbers using the halogen-containing monomers or epoxy monomers as the crosslinking monomeric component, and the properties of the vulcanizates are not satisfactory for practical purposes. Moreover, acrylic rubbers obtained by the ternary copolymerization of allyl methacrylate, an alkyl acrylate and acrylonitrile are also known (Japanese Patent Publication No. 7893/72). But these acrylic rubbers have poor mechanical strength, and cannot find practical application.

When in accordance with this invention, at least one monomer of general formula (I) (i.e., an alkenyl acrylate or alkenyl methacrylate) is used as the crosslinking monomer, these defects can be markedly remedied. If the amount of the monomer (2) is less than 0.5% by weight, the rate of cure is extremely low, and vulcanizates having properties satisfactory for practical application cannot be obtained. If the amount of the monomer (2) exceeds 10% by weight, the cured product has very high hardness, and a greatly reduced elongation, and therefore, cannot be used satisfactorily as a rubber product.

Examples of the alkoxyalkyl acrylate (3) include methoxymethyl acrylate, methoxyethyl acrylate, ethoxyethyl acrylate, and butoxyethyl acrylate.

Examples of the monovinyl and monovinylidene unsaturated compounds (4) include acrylonitrile, vinyl acetate, styrene, acrylamide, methyl methacrylate, ethyl methacrylate, methacrylonitrile, and vinylidene chloride. These unsaturated compounds are used in the aforesaid amounts when required to control the strength and oil resistance of the acrylic rubber [I] used in this invention.

The acrylic rubber [I] used in this invention can be easily produced by polymerizing a mixture of the monomers (1), (2) and (3) and optionally (4) in the presence of a radical initiator by a known polymerization method (e.g., in emulsion, suspension, solution, or bulk). The polymerization is performed batchwise, or while adding at least one component continuously and/or intermittently during the reaction. The polymerization temperature is preferably from $-10°$ C. to $+100°$ C., more preferably from $2°$ to $80°$ C.

The resulting acrylic rubber [I] can be easily cured with sulfur vulcanization systems generally used for natural rubbers or diene-type synthetic rubbers, and this curing treatment does not require the very long heat-treatment after curing which is essential in the curing of ordinary acrylic rubbers having a halogen-containing monomer or epoxy monomer as crosslinking sites. The cured products have superior heat resistance, weatherability and ozone resistance, and in some cases, a well balanced combination of cold resistance and oil resistance. Furthermore, the acrylic rubbers used in this invention have markedly improved heat resistance and compression set over the known sulfur-curable acrylic rubbers.

In the present invention, the metal compound [II] and the sulfur and/or sulfur-containing organic compound are added as a vulcanization system to the acrylic rubber [I].

The metal compounds are the oxides, hydroxides, carbonates or organic carboxylic acid salts of metals preferably Zn, Cd, Fe, Sn, Cu, Sr, Ca, Pd, or Ba. Typical examples are zinc oxide, lead monoxide, red lead, lead carbonate, basic lead carbonate, zinc stearate, and copper oleate. The amount of the metal compound [II] is 1 to 5 parts by weight per 100 parts by weight of the acrylic rubber [I]. If it is less than 1 part by weight, the vulcanization reaction is extremely slow, and it is impossible to obtain vulcanizates having satisfactory properties for practical application. If, on the other hand, it exceeds 5 parts by weight, the heat resistance of the vulcanizates is extremely reduced.

The sulfur-containing organic compounds [III] are sulfur-containing compounds used as vulcanizers and vulcanization accelerators. Examples include thiazole compounds such as 2-mercaptobenzothiazole, 2-mercaptobenzothiazole zinc salt, dibenzothiazyl disulfide and 2-(4′-morpholinodithio)benzothiazole; sulfenamide compounds such as N-cyclohexyl-2-benzothiazylsulfenamide, N,N-dicyclohexyl-2-benzothiazyl sulfenamide and N-oxyethylene-2-benzothiazyl sulfenamide; thiourea compounds such as thiocarbanilide, diorthotolylurea, 2-mercaptoimidazoline, dibutylthiourea and dimethylethylthiourea; thiuram compounds such as tetramethylthiuram monosulfide, tetramethylthiuram disulfide, tetraethylthiuram disulfide, dipentamethylenethiuram tetrasulfide and dipentamethylenethiuram hexasulfide; dithiocarbamate compounds such as zinc diethyldithiocarbamate, zinc dimethyldithiocarbamate, copper dimethyldithiocarbamate, and lead ethylphenyldithiocarbamate; triazine compounds such as 2-dimethylamino-4,6-dimercapto-S-triazine, 2-diethylamino-4,6-dimercapto-S-triazine, 2-butylamino-4,6-dimercapto-S-triazine, 2-benzylamino-4,6-dimercapto-S-triazine and 2,4,6-trimercapto-S-triazine; and other sulfur-containing organic compounds such as morpholine disulfide and 4,4′-dithiomorpholine. The amount of sulfur and/or the sulfur-containing organic compound [III] is 0.2 to 5 parts by weight, preferably 0.5 to 3 parts by weight, as sulfur, per 100 parts by weight of the acrylic rubber [I]. If the amount is less than 0.2 part by weight, the rate of cure is extremely slow, and it is impossible to obtain satisfactory physical properties for rubber products. If, on the other hand, the amount exceeds 5 parts by weight, the heat resistance and compression set of the vulcanizates are extremely poor.

In addition to the vulcanization systems [II] and [III], various compounding agents such as reinforcing agents, fillers, plasticizers and antioxidants may be added to the acrylic rubber [I], as required.

The cured products of the acrylic rubber compositions of this invention are useful in many applications which require heat resistance, oil resistance, weatherability and ozone resistance. They include, for example, various rubber products such as gaskets hoses, conveyor belts, packings, oil seals and valve seats.

The present invention is more specifically illustrated below with reference to Examples and the accompanying drawings.

Figure 2:
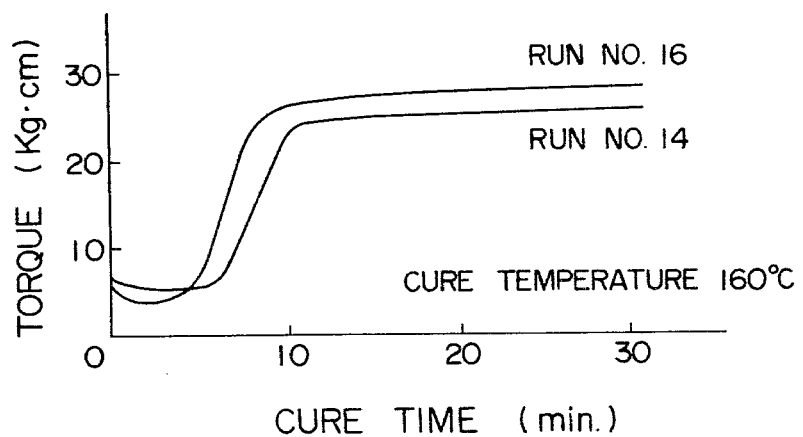

In the drawings,

FIG. 1 shows cure curves of acrylic rubber compositions obtained in Runs Nos. 7, 12 and 13 in Example 2 which were measured by means of an oscillating disc rheometer (a product of Toyo Seiki K. K.); and FIG. 2 show cure curves of acrylic rubber compositions obtained in Runs Nos. 14 and 16 of Example 3 measured in the same way as described above. In these graphic representations, the abscissa represents the cure time (minutes), and the ordinates, the torque (kg.cm). The solid line refers to the example within the scope of this invention, and the broken lines, to comparisons.

EXAMPLE 1

A series of copolymers were produced by using the monomeric mixtures shown in Table 1. The method of polymerization was as follows:

A 2-liter separable flask equipped with a thermometer, a stirrer, a nitrogen introducing tube and an evacuation device was charged with a mixture of the following formulation.

| Water | 1,000 g |
| Sodium dodecylbenzenesulfonate | 20 g |
| Sodium naphthalensulfonate | 10 g |
| Sodium sulfate | 3 g |
| Tetrasodium ethylenediaminetetraacetate | 0.2 g |
| FeSO$_4$ | 0.005 g |
| Monomeric mixture (Table 1) | 1,000 g |

The pH of the mixture was adjusted to 7, and with stirring, the temperature of the inside of the flask was maintained at 5° C. Furthermore, the inside of the flask was deoxygenated fully by using the nitrogen introducing tube and the evacuation device. Then, the following compounds were added, and the reaction was started.

| | |
|---|---|
| Na$_2$S$_2$O$_4$ | 0.2 g |
| Sodium formaldehyde sulfoxylate | 0.2 g |
| p-Menthane hydroperoxide | 0.1 g |

The polymerization was terminated in about 16 hours. After the polymerization, the reaction mixture was salted out, washed with water, and dried under vacuum in a dryer to form an acrylic rubber.

TABLE 1

| Monomers (parts by weight) | Invention Run No. 1 | 2 | 3 | 4 | Comparison 5 | 6 |
|---|---|---|---|---|---|---|
| Ethyl acrylate | 32 | 29 | 27 | 32 | 98 | 95 |
| Butyl acrylate | 30 | 30 | 30 | 30 | — | — |
| Methoxyethyl acrylate | 35 | 35 | 35 | 35 | — | — |
| Acrylonitrile | — | 3 | — | — | — | — |
| Styrene | — | — | 5 | — | — | — |
| 3-Methyl-2-butenyl acrylate | 3 | 3 | 3 | — | — | — |
| 3-Methyl-2-hexenyl acrylate | — | — | — | 3 | — | — |
| Glycidyl methacrylate | — | — | — | — | 2 | — |
| 2-Chloroethyl vinyl ether | — | — | — | — | — | 5 |

Each of the acrylic rubbers obtained was mixed with the compounding agents shown in Table 2 by a roll under cooling. The resulting compounds were each press-cured at 160° C. for 20 minutes, and heat-treated in a Geer oven at 150° C. for 4 hours. In Runs Nos. 5 and 6, the cured products were also heat-treated at 150° C. for 16 hours. The properties of the vulcanizates were measured in accordance with JIS K-6301, and the results are shown in Table 3.

TABLE 2

| Compounding recipe (parts by weight) | Invention 1-4 | Comparison 5 | 6 |
|---|---|---|---|
| Acrylic rubber | 100 | 100 | 100 |
| Stearic acid | 1 | 1 | 1 |
| HAF-LS carbon black | 60 | 60 | 60 |
| Zinc oxide No. 1 | 3 | — | — |
| Read lead | — | — | 5 |
| 2-Mercaptobenzimidazole | — | — | 1.5 |
| Dipentamethylenethiuram tetrasulfide | 3 | — | — |
| N-cyclohexyl-2-benzothiazyl sulfenamide | 1 | — | — |
| Ammonium benzoate | — | 1 | — |

TABLE 3-1

| Test items Run No. | Invention 1 | 2 | 3 | 4 | Comparison 5 | 6 |
|---|---|---|---|---|---|---|
| Properties after curing at 160° C. for 20 minutes | | | | | | |
| Tensile strength (kg/cm$^2$) | 115 | 129 | 133 | 97 | 106 | 98 |
| 100% Tensile stress (kg/cm$^2$) | 37 | 38 | 40 | 34 | 40 | 19 |
| Elongation (%) | 280 | 300 | 300 | 280 | 340 | 490 |
| Hardness (Shore A) | 67 | 67 | 68 | 65 | 63 | 58 |
| Compression set (%)* | 58 | 55 | 53 | 62 | 80 | 89 |

*Compression ratio 25%, 150° C. × 70 hours

TABLE 3-2

| Test items Run No. | Invention 1 | 2 | 3 | 4 | Comparison 5 | 6 |
|---|---|---|---|---|---|---|
| Properties after curing at 160° C. for 20 minutes and then heat-treatment at 150° C. for 4 hours | | | | | | |
| Tensile strength (kg/cm$^2$) | 112 | 131 | 130 | 105 | 113 | 119 |
| 100% Tensile stress (kg/cm$^2$) | 37 | 38 | 39 | 36 | 53 | 31 |
| Elongation (%) | 280 | 300 | 300 | 280 | 290 | 350 |
| Hardness (Shore A) | 67 | 67 | 68 | 66 | 66 | 62 |
| Compression set (%)* | 27 | 25 | 26 | 31 | 56 | 77 |
| Properties after curing at 160° C. for 20 minutes and then heat-treatment at 150° C. for 16 hours | | | | | | |
| Tensile strength (kg/cm$^2$) | Since the properties reached an equilibrium as a result of the curing at 160° C. for 20 minutes and heat-treatment at 150° C. for 4 hours, the testing of the properties after the 16-hour heat-treatment was omitted. | | | | 134 | 137 |
| 100% Tensile stress (kg/cm$^2$) | | | | | 69 | 62 |
| Elongation (%) | | | | | 210 | 220 |
| Hardness (Shore A) | | | | | 69 | 69 |
| Compression set (%)* | | | | | 29 | 59 |
| Heat aging test (in a Geer oven at 175° C. for 70 hours)** | | | | | | |
| Percent change in tensile strength (%) | −23 | −30 | −18 | −27 | +15 | −37 |
| Percent change in elongation (%) | +7 | +7 | +3 | −18 | −20 | −43 |
| Change in hardness (point) | +12 | +12 | +11 | +14 | +9 | +8 |
| Heat aging test in oil (150° C. for 70 hours in ASTM No. 3 oil)** | | | | | | |

TABLE 3-2-continued

| Test items | Run No. | Invention | | | | Comparison | |
|---|---|---|---|---|---|---|---|
| | | 1 | 2 | 3 | 4 | 5 | 6 |
| Percent change in volume (%) | | +17.2 | +14.8 | +14.2 | +18.1 | +16.7 | +17.8 |
| Cold resistance test (low-temperature torsion test in JIS (K-6301)** | | | | | | | |
| T-10 (°C.) | | −24 | −21 | −18 | −24 | −10 | −10 |

**In Runs Nos. 1 to 4, samples cured at 160° C. for 20 minutes (not heat-treated subsequently) were used, and in Runs Nos. 5 and 6, samples cured at 160° C. for 20 minutes and then heat-treated at 150° C. for 16 hours were used.

EXAMPLE 2

The acrylic rubber obtained in Run No. 1 of Table 1 in Example 1 was compounded by a roll in accordance with the recipes shown in Table 4. Each of the compounds obtained was press-cured at 160° C. for 20 minutes, and heat-treated in a Geer oven at 150° C. for 4 hours.

The properties of the resulting vulcanizates were measured in accordance with JIS K-6301, and the results are shown in Table 5.

The vulcanization behaviors of the acrylic rubber composition of this invention (Run No. 7) and the acrylic rubber compositions of comparison (Runs Nos. 12 and 13) were measured by an oscillating disc rheometer, and the relation between the cure time and the torque were plotted in FIG. 1.

TABLE 4

| Recipe (parts by weight) | Run No. | Invention | | | | Comparison | | |
|---|---|---|---|---|---|---|---|---|
| | | 7 | 8 | 9 | 10 | 11 | 12 | 13 |
| Acrylic rubber | | 100 | 100 | 100 | 100 | 100 | 100 | 100 |
| Stearic acid | | 1 | 1 | 1 | 1 | 1 | 1 | 1 |
| HAF-LS carbon black | | 60 | 60 | 60 | 60 | 60 | 60 | 60 |
| Zinc oxide No. 1 | | 3 | 3 | 3 | 3 | — | 3 | — |
| Sulfur | | 0.5 | 1.5 | — | — | — | — | — |
| Tetramethylthiuram disulfide | | 2 | — | 2 | 2 | 2 | — | — |
| 4,4′-Dithiomorpholine | | — | 1 | 2 | 2 | 2 | — | — |
| N-cyclohexyl-2-benzothiazyl sulfenamide | | — | 1 | — | 1 | 1 | — | — |
| Dimercaptobenzothiazole | | 1 | — | — | — | — | — | — |
| 2-Mercaptobenzothiazole | | — | — | 1 | — | — | — | — |
| Percumyl D *1 | | — | — | — | — | — | 3 | — |
| Ethylene glycol dimethacrylate | | — | — | — | — | — | 2 | — |
| Takirol 250-1 *2 | | — | — | — | — | — | — | 12 |

*1 dicumyl peroxide, a trademark for a product of Nippon Oils and Fats Co., Ltd.
*2 alkylphenol formaldehyde resin, a trademark for a product of Sumitomo Chemical Co., Ltd.

TABLE 5

| Test items | Run No. | Invention | | | | Comparison | | |
|---|---|---|---|---|---|---|---|---|
| | | 7 | 8 | 9 | 10 | 11 | 12 | 13 |
| Properties after curing at 160° C. for 20 minutes | | | | | | | | |
| Tensile strength (kg/cm$^2$) | | 137 | 144 | 120 | 118 | Vulcanization did not take place | 91 | 36 |
| 100% Tensile stress (kg/cm$^2$) | | 41 | 44 | 34 | 36 | | 27 | 20 |
| Elongation (%) | | 300 | 300 | 290 | 280 | | 280 | 280 |
| Hardness (Shore A) | | 68 | 69 | 64 | 66 | | 55 | 51 |
| Properties after curing 160° C. for 20 minutes and subsequent heat-treatment at 150° C. for 4 hours | | | | | | | | |
| Tensile strength (kg/cm$^2$) | | 134 | 148 | 121 | 118 | Vulcanization did not take place | 109 | 103 |
| 100% Tensile stress (kg/cm$^2$) | | 42 | 45 | 34 | 36 | | 33 | 35 |
| Elongation (%) | | 290 | 300 | 290 | 280 | | 260 | 220 |
| Hardness (Shore A) | | 68 | 70 | 64 | 66 | | 62 | 63 |

EXAMPLE 3

Using the acrylic rubber obtained in Run No. 1 in Table 1 of Example 1, compounds were prepared in accordance with the compounding recipes shown in Table 6 by means of a roll. The compounds were each press-cured at 160° C. for 20 minutes.

The properties of the vulcanizates were measured in accordance with JIS K-6301, and the results are shown in Table 6.

The vulcanization behaviors of the acrylic rubber compositions of Runs Nos. 14 and 16 were measured by an oscillating disc rheometer, and the results were plotted in FIG. 2.

TABLE 6

| Recipe (parts by weight) | Run No. | Invention | | |
|---|---|---|---|---|
| | | 14 | 15 | 16 |
| Acrylic rubber | | 100 | 100 | 100 |
| Stearic acid | | 1 | 1 | 1 |
| Nipsil VN-3 *3 | | 60 | — | — |
| Carplex 80 *4 | | — | 60 | — |
| Carplex 67 *5 | | — | — | 60 |
| Zinc oxide No. 1 | | 3 | 3 | 3 |
| 4,4'-Dithiomorpholine | | 2 | 2 | 2 |
| N-cyclohexyl-2-benzothiazyl sulfenamide | | 1 | 1 | 1 |
| Tetramethylthiuram disulfide | | 2 | 2 | 2 |
| Properties after curing at 160° C. for 20 minutes | | | | |
| Tensile strength (kg/cm$^2$) | | 156 | 129 | 136 |
| 100% Tensile stress (kg/cm$^2$) | | 26 | 34 | 42 |
| Elongation (%) | | 440 | 360 | 320 |
| Hardness (Shore A) (point) | | 73 | 66 | 68 |

*3 silica-type reinforcing agent, a trademark for a product of Nippon Silica Co., Ltd.
*4 silica-type reinforcing agent, a trademark for a product of Shionogi Pharmaceutical Co., Ltd.
*5 silica-type reinforcing agent, a trademark for a product of Shionogi Pharmaceutical Co., Ltd.

As can be seen from FIGS. 1 and 2, the acrylic rubber compositions of this invention differ markedly from known acrylic rubber compositions in that the former cure rapidly within relatively short periods of time, and then reach an equilibrium.

Accordingly, as shown in Tables 3 and 5, the acrylic rubber compositions of this invention can attain satisfactory properties only by press-curing them at 160° C. for 20 minutes, and moreover permit the improvement of the poor heat resistance and compression set of known sulfur-curable acrylic rubbers. In contrast, the known acrylic rubber compositions must be heat-treated at 150° C. for more than 8 hours after the press-curing at 160° C. for 20 minutes in order to obtain equivalent vulcanization properties to the acrylic rubber compositions of this invention.

It is further seen from Table 3 that an acrylic rubber composition having a well balanced combination of cold resistance and oil resistance can be obtained by using the alkoxyalkyl acrylate.

It is thus concluded that according to this invention the slow rate of cure associated with the conventional acrylic rubbers can be increased to a level equivalent to that for diene-type rubbers without sacrificing the superior heat resistance, oil resistance, weatherability and ozone resistance of the conventional acrylic rubbers, and that an acrylic rubber composition having a low compression set and a well balanced combination of cold resistance and oil resistance can be obtained.

What we claim is:

1. A sulfur-curable acrylic rubber composition comprising (I) 100 parts by weight of an acrylic rubber resulting from the copolymerization in the presence of a radical initiator of
   (1) 30 to 89.5% by weight of at least one alkyl acrylate with the alkyl group containing 1 to 8 carbon atoms,
   (2) 0.5 to 10% by weight of at least one monomer of the general formula

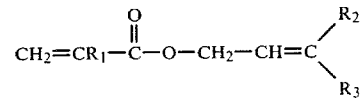

wherein R$_1$ represents a hydrogen atom or a methyl group, and R$_2$ and R$_3$, independently from each other, represent an alkyl group containing 1 to 3 carbon atoms,
   (3) 10 to 60% by weight of at least one alkoxyalkyl acrylate with the alkoxy group containing 1 to 4 carbon atoms and the alkylene group containing 1 to 4 carbon atoms, and
   (4) 0 to 30% by weight of at least one of monovinyl and monovinylidene unsaturated compounds other than the said compounds;
   (II) 1 to 5 parts by weight of a metal compound usable as a vulcanization activator for rubber and selected from the group consisting of metal oxides, metal hydroxides, metal carbonates and organic carboxylic acid salts of metals; and
   (III) 0.2 to 5 parts by weight, as sulfur, of at least one of sulfur and sulfur-containing organic compounds usable as vulcanizers and vulcanization accelerators and is a member selected from the group consisting of thiazole compounds, sulfenamide compounds, thiourea compounds, thiuram compounds, dithiocarbamate compounds, triazine compounds, morpholine disulfide and 4,4'-dithiomorpholine.

2. The composition of claim 1 wherein the monomer (2) represented by the general formula is 3-methyl-2-butenyl acrylate.

3. The composition of claim 1 wherein the monomer (2) represented by the general formula is 3-methyl-2-butenyl methacrylate.

4. The composition of claim 1, wherein the alkyl group of the alkyl acrylate monomer (1) has from 2 to 4 carbon atoms.

5. The composition of claim 1, wherein the alkyl acrylate monomer (1) is an approximately equal mixture of ethyl acrylate and butyl acrylate.

6. The composition of claim 1, wherein the alkoxyalkyl acrylate monomer (3) is methoxyethyl acrylate.

7. The composition of claim 1, wherein component III is present in the amount of from about 0.5 to about 3 parts by weight.

8. The composition of claim 1 wherein the metal compound vulcanization activator (II) is a member selected from the group consisting of zinc oxide, lead monoxide, red lead, lead carbonate, basic lead carbonate, zinc stearate, and copper oleate.

9. The composition of claim 1 wherein component (III) is sulfur.

10. The composition of claim 1 wherein component (III) is a sulfur-containing compound selected from the group consisting of 2-mercaptobenzothiazole, 2-mercaptobenzothiazole zinc salt, dibenzothiazyl disulfide, 2-(4'-morpholinodithio)benzothiazole, N-cyclohexyl-2-benzothiazylsulfenamide, N,N-dicyclohexyl-2-benzothiazyl sulfenamide, N-oxyethylene-2-benzothiazyl sulfenamide, thiocarbanilide, diorthotolylurea, 2-mercaptoimidazoline, dibutylthiourea, dimethylethylthiourea, tetramethylthiuram monosulfide, tetramethylthiuram disulfide, tetraethylthiuram disulfide, depentamethylenethiuram tetrasulfide, dipentamethylenethiuram hexasulfide, zinc diethyldithiocarbamate, zinc dimethyldithiocarbamate, copper dimethyldithiocarbamate, lead ethylphenyldithiocarbamate, 2-dimethylamino-4,6-dimercapto-S-triazine, 2-diethylamino-4,6-dimercapto-S-triazine, 2-butylamino-4,6-dimercapto-S-triazine, 2-benzylamino-4,6-dimercapto-S-triazine, 2,4,6-trimercapto-S-triazine, morpholine disulfide and 4,4'-dithiomorpholine.

* * * * *